Sept. 9, 1930.  E. S. CAMERON  1,775,508
BIG END CONSTRUCTION FOR MOTORS
Filed March 17, 1928  2 Sheets-Sheet 1
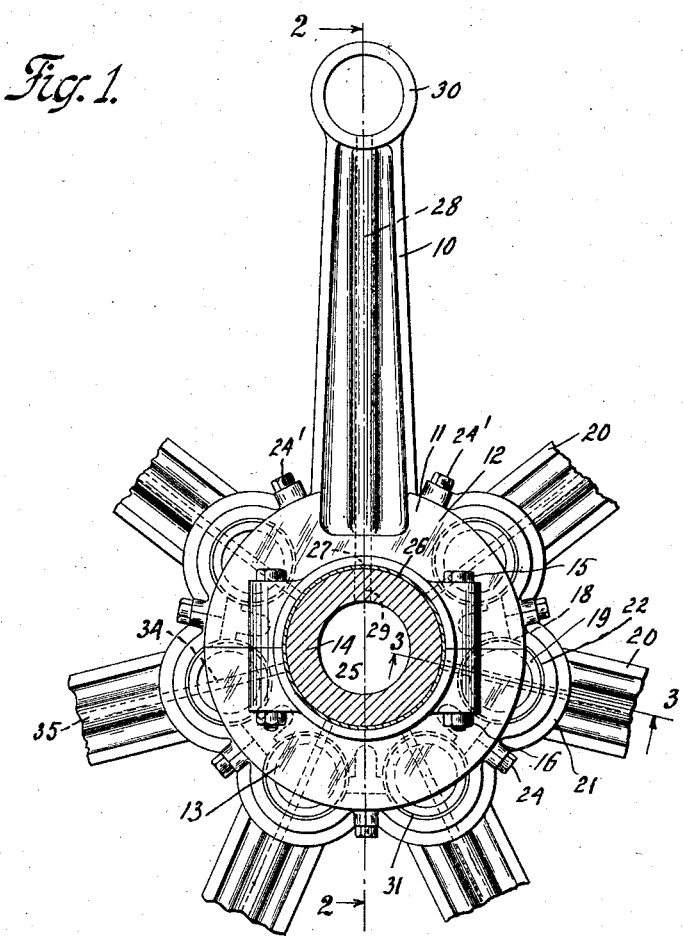
Fig. 1.
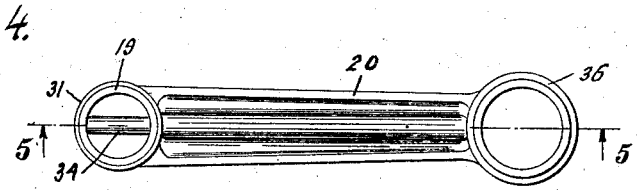
Fig. 4.
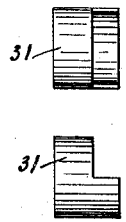
Fig. 7.
Fig. 6.
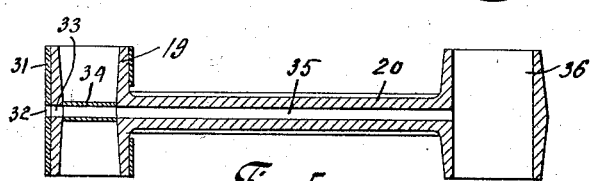
Fig. 5.
INVENTOR
E. S. Cameron
BY
Sigmund Herzog
ATTORNEY Sept. 9, 1930.   E. S. CAMERON   1,775,508
BIG END CONSTRUCTION FOR MOTORS
Filed March 17, 1928   2 Sheets-Sheet 2
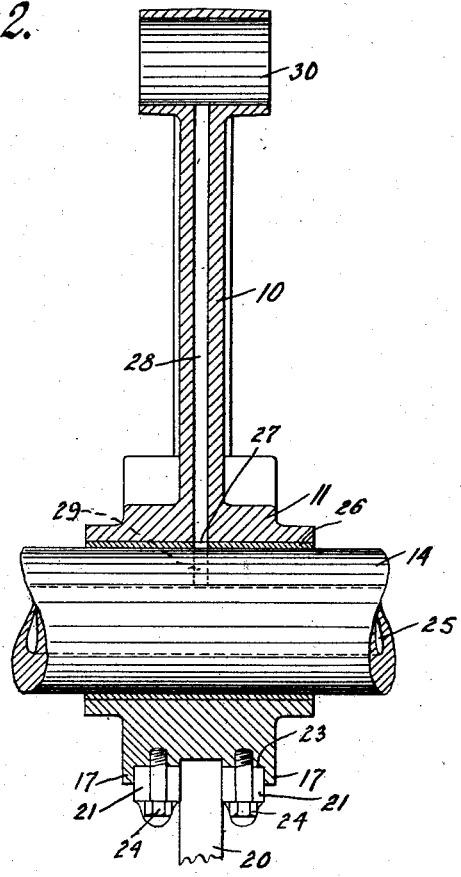
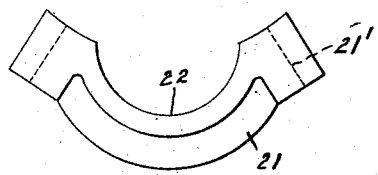
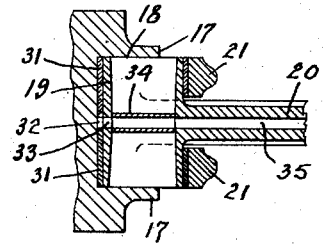
INVENTOR
E. S. Cameron
BY
Sigmund Herzog
ATTORNEY Patented Sept. 9, 1930

1,775,508

UNITED STATES PATENT OFFICE

EVERETT S. CAMERON, OF TOTTENVILLE, NEW YORK

BIG-END CONSTRUCTION FOR MOTORS

Application filed March 17, 1928. Serial No. 262,455.

The present invention relates to improvements in the articulation of connecting rods in aviation engines; and more particularly of the type in which the connecting rods are disposed about a common crank shaft and in which a master or main connecting rod is provided with a big-end, made integral therewith or rigidly attached thereto, and the feet of a plurality of secondary connecting rods are oscillatably mounted on said big-end.

In the articulation of connecting rods disposed about a common crank shaft, one of the features most difficult to effect in practical design has been the articulation of the feet of the secondary connecting rods on the common crank pin bearing which is to receive the thrust. The chief difficulties in constructions of this type are to obtain a large individual bearing for each secondary connecting rod without unduly increasing the distance of the centers of articulation from the axis of the crank pin, and to provide for proper lubrication of said bearings and, incidentally, of the bearings of the connecting rods on the piston wrist pins.

The main object of the present invention is to provide a new form of articulation which permits of assembly on a very small radius and provides bearings larger than the usual maximum size of pivoted connecting rods allow.

Another object of the invention is to provide a big-end construction in which the feet of the secondary piston rods are effectively lubricated and the lubricant is carried through the master and secondary piston connecting rods to their connections with the several pistons wrist pins.

A further object of the invention is to produce a design of the type mentioned which is exceedingly simple in construction, efficient in operation, durable in use, which may be readily and conveniently assembled and taken apart.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is a side elevation of the improved big-end assembly with the crank pin in section; Fig. 2 is a section taken on line 2—2 of Fig. 1; Fig. 3 is a section taken on line 3—3 of Fig. 1; Fig. 4 is a side elevation of one of the secondary connecting rods; Fig. 5 is a section taken on line 5—5 of Fig. 4; Fig. 6 is a side elevation of a bushing applied to the foot of a secondary connecting rod; Fig. 7 is a top plan view of the said bushing; Fig. 8 is a side elevation, on a larger scale, of a cap used in oscillatably mounting a secondary connecting rod on the big-end of the master rod; and Fig. 9 is a top plan view of the element shown in Fig. 8.

In the drawings, the numeral 10 indicates a master connecting rod, the big-end 11 of which is in the form of a ring. This ring is made of two sections 12 and 13, to permit proper mounting thereof on the crank pin 14. The section 12 is made integral with the rod 10, and the section 13 is united therewith by screw bolts 15 and nuts 16. The ring is provided with two spaced flanges 17, extending at right angles to the longitudinal axis of the crank pin, and has formed between these flanges a plurality of equidistantly spaced substantially semicircular recesses 18, into each of which is oscillatably fitted the foot 19 of a secondary connecting rod 20. These feet are of cylindrical configuration, as clearly shown in Figs. 3 to 5, inclusive, of the drawings, and are, for structural reasons, preferably hollow. For the purpose of maintaining the said feet in said recesses, with each of the same are associated two clamps 21, each of which has a substantially semicylindrical recess 22, fitting said feet. As appears from Fig. 3 of the drawings, these clamps engage a foot on opposite sides of the rod and rest on ledges 23 of the ring 11 between the flanges 17 of the latter. Screw-bolts 24 serve to detachably fix the clamps to the ring 11. In the case illustrated, adjoining clamps on each side of the rods abut against one another, the said adjoining ends being each provided with a semicylindrical bore 21′, in alignment with the bore in the next clamp in the series, so that each of the screw bolts 24 serves to fasten two clamps to the ring 11, as clearly shown in Fig. 1 of the drawings. Those ends of those clamps which are adjacent the master rod 10 are provided with cylindrical bores, so that the screw bolts 24′ (Fig. 1) extend through one clamp only. The recesses 18 and the clamps 21 form thus bearings for the feet of the secondary connecting rods.

The crank pin 14 is hollow, as indicated at 25, so as to allow circulation of the lubricating oil therethrough in the crank case of the motor. The ring 11 is provided with a bushing 26 having an aperture 27 (Fig. 2), and with this aperture is in alignment a bore 28, the latter extending throughout the length of the connecting rod. The crank pin is provided with a radial bore 29, which is adapted, in the rotation of the pin, to register with the aperture 27 and the bore 28, whereby not only the bearing surface of the bushing but also the outer bearing 30 of the master rod is properly lubricated.

The foot 19 of each secondary connecting rod is provided with an exterior bushing 31, preferably made of two parts. These parts do not contact with each other (Figs. 3 and 5), there being a gap 32 between the same, and in alignment with this gap each foot 19 is provided with an aperture 33, connected by a tube 34 with a bore 35 in the rod, as clearly shown in Figs. 3 to 5, inclusive, of the drawings. In the rotation of the crank pin 14, the bore 29 therein is brought in succession into alignment with the several tubes 34, so that the lubricating material is caused to flow, preferably by pressure, to the outer ends 36 of the secondary connecting rods, thereby properly lubricating their connections with the several piston wrist pins.

From the foregoing it will be observed that the above described construction affords maximum bearing surface for each rod foot in an articulation which is capable of short radius assembly, so that each rod is footed close to the longitudinal axis of the crank pin and has a broad easy bearing of large diameter to take its thrust and accommodate its motion. It will also be noted that both the big-end of the assembly and the outer ends of the connecting rods are properly lubricated; that the construction is exceedingly simple, efficient in operation, durable in use and may be readily and conveniently assembled and taken apart.

What I claim is:—

1. In an internal combustion engine, the combination with an engine shaft having a crank pin, of a master connecting rod having a ring-shaped big-end mounted on said pin and provided with two spaced flanges extending at right angles to the longitudinal axis of said crank pin, said ring being provided between said flanges with a plurality of equidistantly spaced substantially semi-cylindrical recesses, a plurality of secondary connecting rods having cylindrical feet fitted into said recesses, the ends of said feet abutting against said flanges, and two clamps associated with each foot fixed to said ring, said clamps having substantially semi-cylindrical recesses in engagement with the respective foot and forming in connection with the respective recess in said ring a bearing for said foot.

2. In an internal combustion engine according to claim 1, said crank pin being hollow to provide for circulation of lubricating material therethrough and having a radial bore therein, said master connecting rod being provided with a longitudinal bore adapted to register in the rotation of said crank pin with the radial bore in the latter, said feet being hollow and each provided with an aperture adapted to register in the rotation of said crank pin with the radial bore in the latter, a two-part bushing on each foot having a gap therebetween to leave the aperture in the foot uncovered, each secondary connecting rod being provided with a longitudinal bore in alignment with the aperture in the foot thereof, and a tube in each foot connecting the aperture therein with the bore in the secondary connecting rod.

3. In an internal combustion engine according to claim 1, said crank pin being hollow to provide for circulation of lubricating material therethrough and having a radial bore therein, said master connecting rod being provided with a longitudinal bore adapted to register in the rotation of said crank pin with the radial bore in the latter, said feet being hollow and each provided with an aperture to register in the rotation of said crank pin with the radial bore in the latter, each secondary connecting rod being provided with a longitudinal bore in alignment with the aperture in the foot thereof, and a tube in each foot connecting the aperture therein with the bore in the secondary connecting rod.

Signed at New York, in the county of New York and State of New York, this 25th day of February, A. D. 1928.

EVERETT S. CAMERON.